United States Patent
Sobel et al.

(10) Patent No.: US 8,429,180 B1
(45) Date of Patent: Apr. 23, 2013

(54) COOPERATIVE IDENTIFICATION OF MALICIOUS REMOTE OBJECTS

(75) Inventors: William E. Sobel, Stevenson Ranch, CA (US); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 624 days.

(21) Appl. No.: 12/058,941

(22) Filed: Mar. 31, 2008

(51) Int. Cl.
*G06F 17/30* (2006.01)
*G06F 11/00* (2006.01)

(52) U.S. Cl.
USPC ............................................ 707/758; 726/24

(58) Field of Classification Search .................... 707/952
See application file for complete search history.

(56) References Cited

U.S. PATENT DOCUMENTS

| | | | |
|---|---|---|---|
| 2004/0068579 A1* | 4/2004 | Marmigere et al. | 709/242 |
| 2005/0257048 A1* | 11/2005 | Willman | 713/165 |
| 2006/0075500 A1* | 4/2006 | Bertman et al. | 726/24 |
| 2007/0244920 A1* | 10/2007 | Palliyil et al. | 707/102 |
| 2007/0300179 A1* | 12/2007 | Friedlander | 715/781 |
| 2008/0141371 A1* | 6/2008 | Bradicich et al. | 726/23 |
| 2008/0222717 A1* | 9/2008 | Rothstein et al. | 726/14 |

OTHER PUBLICATIONS

Burnett, M., "Forensic Log Parsing with Microsoft's LogParser," SecurityFocus, Jul. 18, 2003, [online] [Retrieved on Apr. 9, 2008] Retrieved from the Internet <URL:http://www.securityfocus.com/infocus/1712>.

* cited by examiner

*Primary Examiner* — Tarek Chbouki
(74) *Attorney, Agent, or Firm* — Fenwick & West LLP (57) ABSTRACT

A computer, computer program product, and method identify potentially malicious remote objects using client cooperation. A remote object access module detects client device access of a remote object instance, and an object analysis system identifies an associated location, creates a content identification value for the instance, compares it to stored content identification values for previous instances, and if anomalous, analyzes the stored content identification values to determine whether malicious. The remote object access module monitors actual traffic received by the client, and stores the information across multiple clients for comparison, allowing more accurate detection of malicious remote objects than traditional web crawling.

20 Claims, 4 Drawing Sheets

COOPERATIVE IDENTIFICATION OF MALICIOUS REMOTE OBJECTS

BACKGROUND OF THE INVENTION

1. Field of the Invention

This invention pertains in general to identification of malicious remote objects and in particular to a cooperative system for detection of potentially malicious remote objects in the transmission path to a client.

2. Description of the Related Art

Conventional attempts to catalogue malicious websites use web crawlers to retrieve pages and classify the pages and their content. However, a malicious web server has control over what content is presented, to whom, and when. Thus, malicious web servers can serve content to a web crawler that appears to be clean, while serving malicious content to end users of the website, using information such as the internet protocol (IP) address of the requestor. Security web crawler IP addresses, e.g., often are published and/or otherwise well known.

Malicious web servers also can block crawler IP addresses, provide malicious data only sometimes (e.g., every X visitor, only on X day of the week, etc.), and lure end users using side channels only, such as instant messenger (IM) and email, rather than via direct links to the malicious content. As a result, conventional Web filters are unable to adequately block malware websites. Thus, the only place guaranteed to provide the same data that the end user is retrieving is the communications path between the end user and the website.

BRIEF SUMMARY

The above and other needs are met by a computer, computer program product, and method for cooperative identification of potentially malicious remote objects. Embodiments of the computer program product comprise a remote object access module for detecting client device access to a remote object instance, and an identification module for identifying a location for the instance and creating a content identification value for the content, a value comparison module for comparing the created content identification value to stored content identification values associated with previous object instances, and if anomalous, analyzing the stored content identification values to determine whether the remote object is malicious.

Because the only place guaranteed to provide the same data that the client is retrieving is the communications path between the end user and the website, the present invention allows the remote object access module to monitor the actual traffic received by the client, and to store that information across multiple clients for comparison. This allows for more accurate detection of malicious remote objects than does traditional web crawling.

Embodiments of the method comprise in response to detecting client device access to a remote object, identifying a location (e.g., URL) for the instance, creating a content identification value for the instance content, comparing the created content identification value to stored content identification values, and if anomalous, analyzing the stored content identification values to determine if the instance is malicious.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

A cooperative system for detection of potentially malicious remote objects in the transmission path to a client is disclosed herein. Because the actual traffic received by the client is monitored, detection of instances of malicious objects is possible even when such malicious objects might go undetected by web crawlers attempting to detect malicious remote objects.

Figure 1:
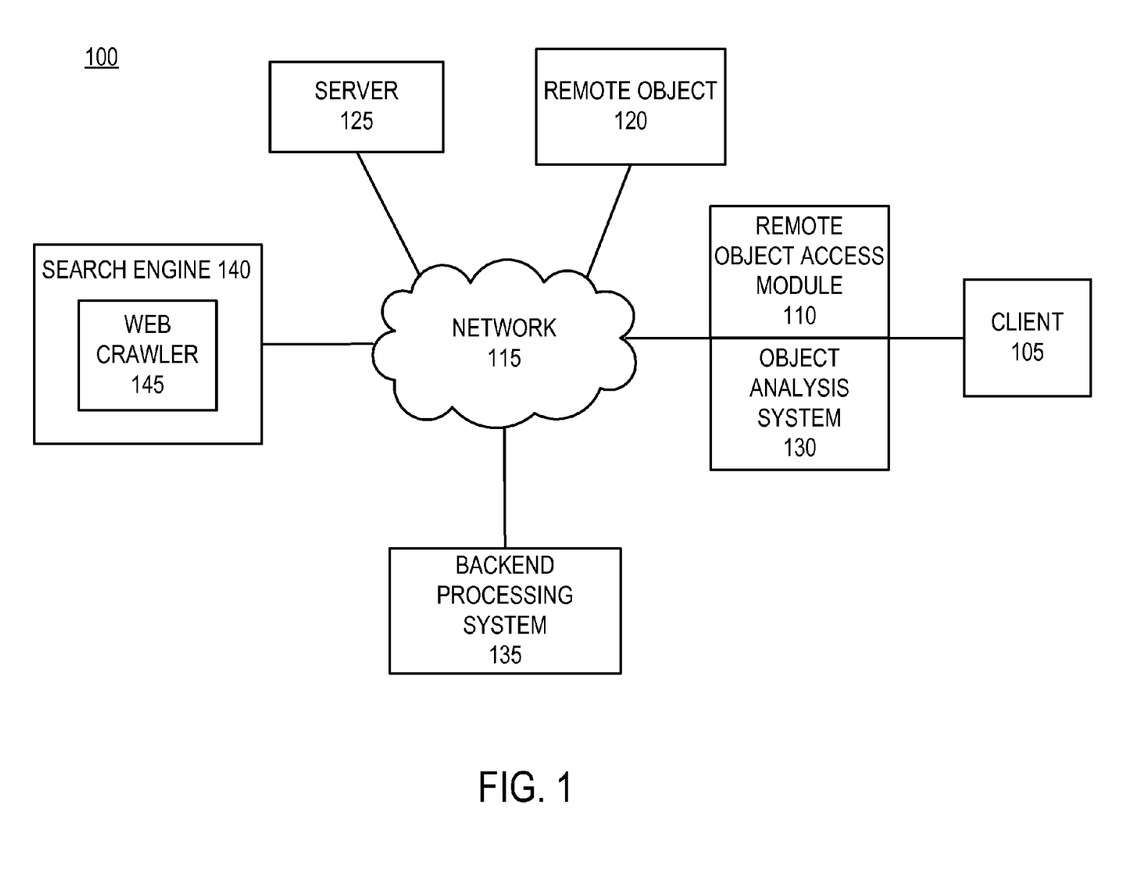
FIG. 1 is a high-level block diagram of a computing environment according to one embodiment.

FIG. 1 is a high-level block diagram of a computing environment 100 according to one embodiment. FIG. 1 illustrates a client 105 connected via a remote object access module 110 to a network 115 for, among other things, accessing a remote object 120. The client 105 also may communicate with a server 125, an object analysis system 130, a backend processing system 135, and a search engine 140 via the network 115. Only one client 105, one remote object 120, and one server 125 are shown in FIG. 1 in order to simplify and clarify the description. Embodiments of the computing environment 100 can have multiple (e.g., thousands or millions of) clients 105, remote objects 120, servers 125, and search engines 140 connected to the network 115.

In one embodiment, the client 105, or client device, is a computer used by one or more users to connect to the network 115 and various network entities, such as remote objects 120, servers 125, object analysis system 130, target backend processing system 135, and search engine 140. The client 105, for example, can be a personal computer or other network-capable device like a personal digital assistant (PDA), mobile telephone, pager, or television "set-top box." For purposes of this description, the term "client" also includes computers such as servers and gateways that have the characteristics described herein.

The client 105 executes one or more applications such as a web browser, email program, word processor, spreadsheet, image viewer, or music player. The application has an interface for executing content received via the network 115, stored on a local disk, or located elsewhere. In a common example, the application is a web browser such as MICROSOFT INTERNET EXPLORER or MOZILLA FIREFOX that includes functionality for downloading web pages, e.g., from a server 120 and executing scripts written in VBScript or JavaScript contained therein. Some content or instances of content downloaded and/or accessed by an application contains malicious code that attempts to exploit a vulnerability in the application or otherwise attack the client 105. The client 105 may have the ability to programmatically label a remote object 120 or location suspicious in response to data received by the object characterization module 340.

A remote object access module 110 monitors network traffic to and from the client 105, for all ports or a subset thereof. The remote object access module 110 may be a network proxy, local or remote to the client 105, or may be a network appliance. Thus, according to one embodiment, the remote object access module 110 may be integrated with client 105. Alternatively, the remote object access module 110 may be implemented as multiple plug-ins to network applications, such as to a web browser, email client, news reader, RDF Site Summary (RSS) feed hander, IM client, and the like. The remote object access module 110 monitors network traffic for access and/or retrieval of instances of remote objects 120 by the client 105. When client 105 access to a remote object 120 instance is detected, the remote object 120 is handed off to an object analysis system 130. Because the remote object access module 110 monitors the actual traffic received by the client 105, it allows for detection of instances of malicious objects 120 accessed or retrieved by clients 105 that might go undetected by web crawlers 145 receiving alternative instances from a malicious site while they are attempting to detect malicious remote objects 120 via crawling.

The network 115 represents the communication pathways between the client 105 and various network entities such as remote objects 120, servers 125, object analysis system 130, backend processing system 135, and search engine 140. In one embodiment, the network 115 is the Internet. The network 115 can also utilize dedicated or private communications links that are not necessarily part of the Internet. In one embodiment, the network 115 uses standard communications technologies and/or protocols such as Ethernet, 802.11, etc. Similarly, the networking protocols used on the network 115 can include the transmission control protocol/Internet protocol (TCP/IP), the hypertext transport protocol (HTTP), the simple mail transfer protocol (SMTP), the file transfer protocol (FTP), etc. The data exchanged over the network 115 can be represented using technologies and/or formats including the hypertext markup language (HTML), the extensible markup language (XML), etc. In addition, all or some of links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

A remote object 120 is downloadable content or data providing downloadable content, e.g., a web page, a downloadable file, scripts written in interpreted languages such as VBScript and JavaScript, executable programs or binaries, images, music, multimedia content, and the like. Some objects 120 or instances of remote object 120 may include malicious code posing a threat to the client 105. For example, the remote object 120 may be a seemingly-innocuous web page that includes a malicious script. Or, a non-malicious instance of an object 120 may be downloaded to some client 105 or web crawlers 145 and a malicious instance of the object 120 to other client 105. A malicious script, when executed by the client 105, attempts to compromise the client 105, e.g., by exploiting a vulnerability of the client 105 or its applications.

A server 125 provides content, including remote objects 120, to the client 105 via the network 115. In one embodiment, the server 125 is a web server that provides content such as HTML web pages. In other embodiments, the server 125 is a different type of server, such as a server dedicated to providing a specific type of content. In some instances, the server 125 may surreptitiously provide malicious code to the client 105, for example, as contained in a remote object 120 as discussed above.

An object analysis system 130 may be a network proxy, local or remote to the client 105, or may be a network appliance. The object analysis system 130 receives remote objects 120 detected by the remote object access module 110, creates content identification values for instances of the objects 120, and compares the created values to known values for the object 120 to identify anomalous object instances that may pose a malicious threat to the client 105. For example, if the created content identification value for an object instance does not match the stored values for the object, the object analysis system 130 labels the object instance suspicious and performs further analysis based on the stored values to rule out legitimate reasons for the anomaly before labeling the object 120 or instance potentially malicious. Potentially malicious object 120 instances are passed to the backend processing system 135 for additional processing. The object analysis system 130 is described in greater detail in conjunction with FIG. 3.

A backend processing system 135 performs further offline and/or backend processing of an object instance, for those identified as anomalous, e.g., generation of signatures for objects or websites known to be malicious. According to some embodiments, the backend processing system 135 may perform such processing and/or analysis of all object instances, whether or not identified as anomalous. The backend processing system 135 is a client of the object analysis system 130 according to one embodiment.

Search engine 140 is an information retrieval system designed to help find information on a computer network, as known in the art. Search engine 140 is a threat scanner search engine according to one embodiment. The search engine 140 can delegate inspection of links to remote objects to a web crawler 145 associated with the search engine 140, to identify threats. According to another embodiment, search engine 140 is a standard Web search engine, which searches for information on the World Wide Web, such as web pages, images, and other types of files. The search engine 140 follows HTTP links, and puts these "target" links in a queue, e.g., in conjunction with a web crawler 145, for later inspection.

The web crawler 145, also known as a web spider or web robot, is a program or automated script which browses the World Wide Web in a methodical, automated manner. The search engine 140 uses web crawling as a means of providing up-to-date data, e.g., by creating a copy of all the visited pages for later processing by the search engine 140 that will index the downloaded pages to provide fast searches. As discussed above, the object 120 instances received by the web crawler 145 visiting a website may differ from object 120 instances received by a client 105 visiting the same site.

Figure 2:
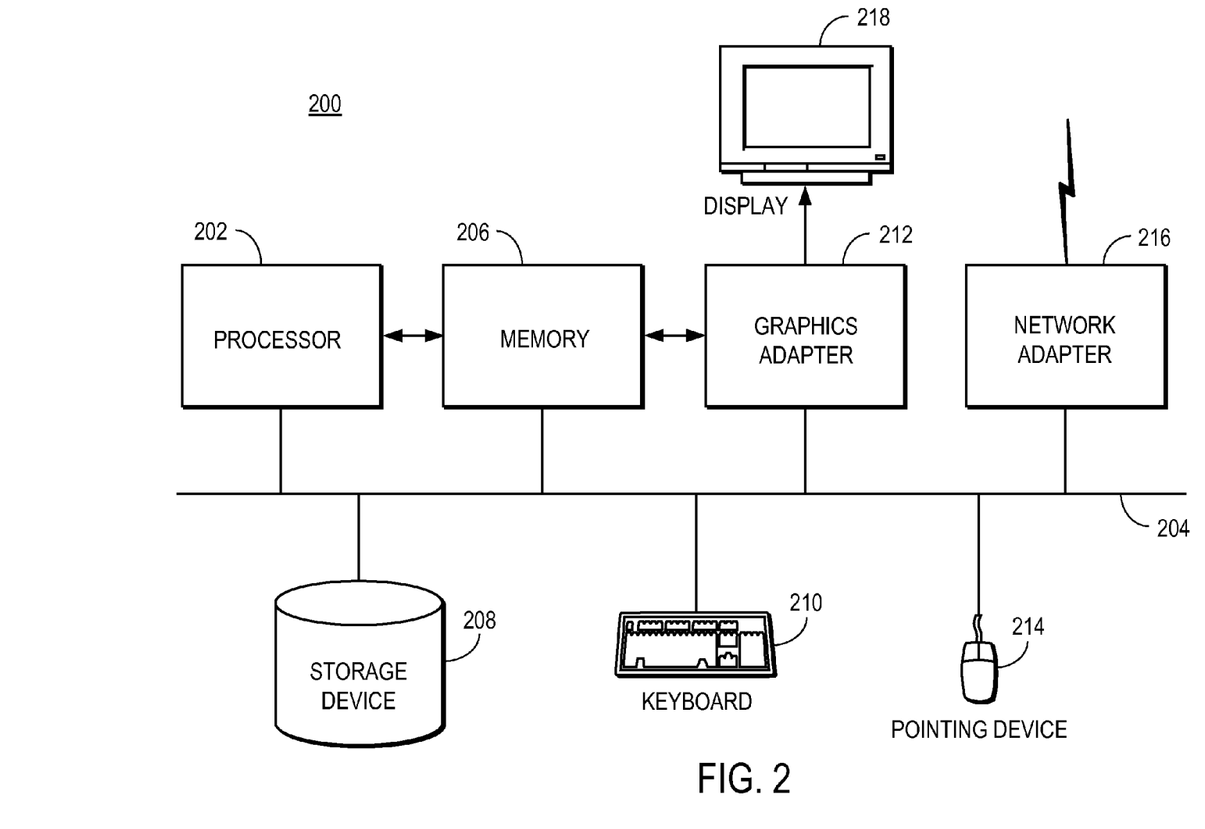
FIG. 2 is a high-level block diagram illustrating a typical computer for use as a client or server according to one embodiment.

FIG. 2 is a high-level block diagram illustrating a typical computer 200 for use as a client 105 or server 125, or for use as a network appliance or proxy such as remote object access module 110 or object analysis system 130. Illustrated are a processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212.

The processor 202 may be any general-purpose processor such as an INTEL x86 compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer 200. The graphics adapter 212 displays images and other information on the display 218. The network adapter 216 couples the computer 200 to the network 114.

The types of computers 200 utilized by the entities of FIG. 1 can vary depending upon the embodiment and the processing power utilized by the entity. For example, a client 105 that is a mobile device such as a PDA typically has limited processing power, a small display 218, and might lack a pointing device 214. The server 125, in contrast, may comprise multiple blade servers working together.

As is known in the art, the computer 200 is adapted to execute computer program modules. As used herein, the term "module" refers to computer program logic and/or data for providing the specified functionality. A module can be implemented in hardware, firmware, and/or software. In one embodiment, the modules are stored on the storage device 208, loaded into the memory 206, and executed by the processor 202. The modules and method described herein may be part of a computer program product stored on a computer-readable storage medium.

In addition, this description uses the term "application" to refer to a program executed by the computer 200. The application is formed of one or more files that typically reside on the storage device 208 and are loaded into memory 206 when executed. At least one of the files loaded into memory 206 is referred to as the "executable image" and is executed as a process. The computer 200 has a state that is defined by the content of the memory 208, values stored in registers of the processor 202, and/or other data within the computer at a given instant.

Figure 3:
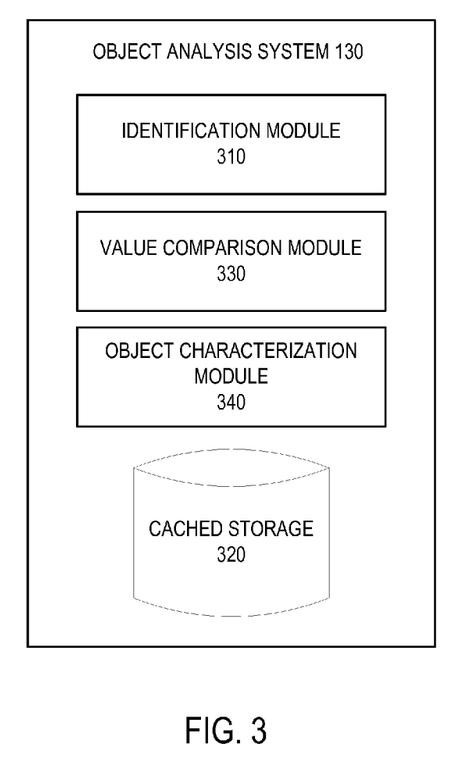
FIG. 3 is a block diagram illustrating a detailed view of an object analysis system according to one embodiment.

FIG. 3 is a block diagram illustrating a detailed view of an object analysis system 130 according to one embodiment. In some embodiments the object analysis system 130 is incorporated into an operating system executing on the client 105 while in other embodiments the object analysis system 130 may be a standalone application or part of another product according to various embodiments. As shown in FIG. 3, the object analysis system 130 includes multiple modules. Those of skill in the art will recognize that other embodiments of the object analysis system 130 can have different and/or other modules than the ones described here, and that the functionalities can be distributed among the modules in a different manner.

The object analysis system 130 includes a content identification module 310, a cached storage 320, a value comparison module 330, and an object analysis system 340 according to one embodiment.

The identification module 310 receives remote objects 120 instances, for which client 105 access is detected by the remote object access module 110. The identification module 310 identifies a location for the remote object 120 instance, and creates a content identification value for the remote object 120 instance. The identification module 310 also may determine a timestamp for the remote object 120 access. The location is identified by a uniform resource locator (URL), and potentially additional information such as Internet protocol (IP) address(es) associated with the location. The content identification value is a hash of the object instance according to one embodiment. However, the content identification value can be accomplished by any method of identifying the object instance according to its content, such as but not limited to a checksum, digital fingerprint, digest, or cryptographic hash function. The identification module 310 also may extract additional information about the object instance. The identification module 310 stores the above data to a master storage, e.g., 430, or the cached storage 320.

Figure 4:
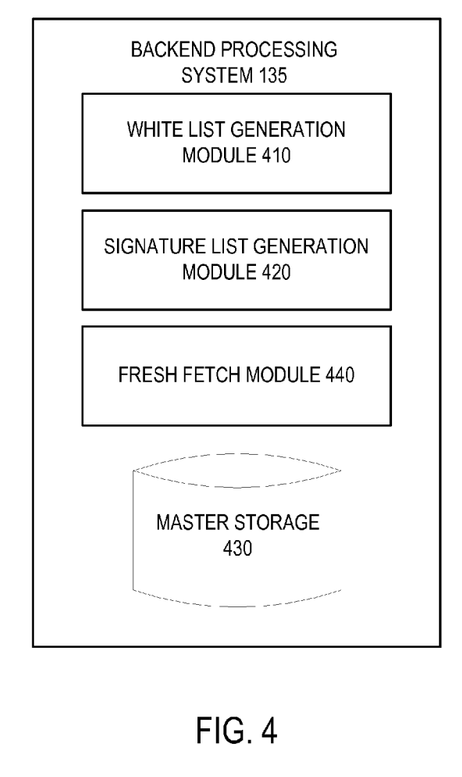
FIG. 4 is a block diagram illustrating a detailed view of a backend processing system according to one embodiment.

The cached storage 320 is a cached version of a master storage 430 according to one embodiment. The cached storage 320 stores information for each instance of a remote object 120 across multiple clients 105, as pushed out to the object analysis system 130 from the backend processing system 135. The cached storage 320 may be a relational database, Extensible Markup Language (XML) file, text file, or any other data storage module. In some embodiments, the cached storage 320 is integrated with the other portions of the object analysis system 130 on the same device. Alternatively, the cached storage 320 may be implemented on a separate device, or may be on client 105.

According to one embodiment, the cached storage 320 includes a catalogue including, for each object instance, a client, a client location (IP address, geographical location, etc.), a remote object, a website or location of the object URL, IP address, etc.), a content identification value (hash, etc.), and a timestamp (e.g., date and time) of retrieval. The cached storage 320 also may include a white list of known safe websites and remote objects 120 and a signature list for objects, instances, or websites known to be malicious.

The value comparison module 330 works closely with the cached storage 320, and can access the location, created content identification value, and timestamp stored therein. In one embodiment, the value comparison module 330 functionality is contained within a database with the cached storage 320. The value comparison module 330 compares the content identification value for the object instance created by the identification module 310, according to the identified location, to stored content identification values for previously retrieved instances of the remote object 120 for the identified location, stored in the cached storage 320. In one embodiment, the comparison comprises a query of the cached storage 320 for a list of content identification values, e.g., hashes, that match the identified location, which returns a list of zero or more stored, e.g., previously viewed, instances of the remote object 120. If the created content identification value matches the values for the stored instances, the match is confirmed to the object characterization module 340. If the created content identification value does not match the stored values, the object instance is labeled anomalous and is passed to the object characterization module 340 for further analysis. An anomaly may correspond to a created value that does not match any of the stored values, or to a value that does not match at least one stored value.

The object characterization module 340 receives an indication from the value comparison module 330 whether the created content identification value for the instances matches the stored content identification values in the cached storage 320. In response to receiving an indication that the created content identification value matches the values for the stored instances, the created content identification value is labeled matching, either by the object characterization module 340, or on the client 105 itself, and no further action is taken. In response to receiving an indication that the created content identification value is anomalous with respect to the values for the stored instances (i.e., does not match), the created content identification value is labeled suspicious, by the object characterization module 340, or on the client 105 itself, and is subjected to further analysis. As discussed above, the labeling may occur on the client 105. The object analysis system 130, including the object characterization module 340 and cached storage 320, may operate according to rules governing the determination of whether a remote object 120 and/or location is trusted, and data regarding the rules can be reported to the client 105, where the labels may be programmatically generated based on the report. For example, a rule could be to label the remote object 120 or location or to warn the client if the location provides different content to all users, or provides different content to users and a scanning engine or other web crawler 145.

At this point the object characterization module 340 may pass on its characterization to the master storage 430, and/or to other clients 105 trying to access a remote object 120 instance with the same content identification value or other content from the website contemporaneous with the investigation. For example, the object characterization module 340 may provide these clients 105 an indication that the object 120 or website is the subject of an investigation and thus could be dangerous.

The object characterization module 340 analyzes statistics for the created content identification value for the stored content identification values for the object to eliminate any legitimate reasons for the anomaly. Statistics may include the timestamps, such that the analyzing statistics comprises analyzing timestamps. For example, legitimate reasons for a created content identification value being anomalous include release of a content update by the website from when the instance was retrieved, that the website provides different content to different regions, and that the website provides unique content to each user. Analysis of the stored values for the object can aid in determining whether any such legitimate circumstances apply. For example, if all stored values for prior object instances are different, then the website likely provides unique content for each user. If some stored values for prior object instances are different, the location of the clients corresponding to each can be compared to see if geographical trends emerge indicating that the website provides different content to different regions. If neither of the above apply, the values stored also could be stale and/or could correspond to content retrieved prior to an update. Thus stored values contemporaneous with the created vales for the instance can be examined to see whether all users after a certain date and/or time have received the anomalous content. If no legitimate reasons for the anomaly are found by the object characterization module 340, the anomalous object instance is labeled potentially malicious, and may be sent to the backend processing system 135 for further analysis. In addition, the object characterization module 340 may compare the object and/or website to a white list of known safe sites and/or remote objects 120, e.g., ahead of the other analysis steps to by pass unnecessary data look up costs. Alternatively, this step can occur at a different time during the process described herein.

The above modules 310-340 need not be discrete modules. The configuration shown in FIG. 3 is meant only by way of example and not limitation; other configurations are within the scope of the present invention.

FIG. 4 is a block diagram illustrating a detailed view of a backend processing system 135 according to one embodiment. The backend processing system 135 includes a white list module 410, a signature list module 420, a master storage 430, and a fresh fetch module 440 according to one embodiment.

The white list module 410 generates and maintains a white list of known safe websites and remote objects 120 that is stored in the master storage module 430. The signature list module 420 generates signatures for objects, instances, or websites known to be malicious, and maintains a list of signatures, e.g., in the master storage 430.

Master storage 430 includes a master copy of information for each instance of a remote object 120 across multiple clients 105, which is pushed out to an object analysis system 130 associated with each client 105. The information in the master storage 430 includes a catalogue including, for each object instance, a client, a client location (IP address, geographical location, etc.), a remote object, a website or location of the object URL, IP address, etc.), a content identification value (hash, etc.), and a timestamp (e.g., date and time) of retrieval according to one embodiment. The master storage 430 also includes a white list of known safe websites and remote objects 120 and a signature list for objects, instances, or websites known to be malicious in this example. The master storage 430 may be a relational database, Extensible Markup Language (XML) file, text file, or any other data storage module. According to one embodiment, the master storage 430 is the single, ultimate storage for the information associated with each instance of a remote object 120 for all clients 105. According to another embodiment, multiple master storages 430 may be used, with the master storage 430 information divided into smaller subsets, e.g., by geographic region. In this example, the multiple master storages 430 may for a peer-to-peer or other shared network.

The fresh fetch module 440 performs further analysis of an object or website by directing a fresh fetch of the object, e.g., using a web crawler 145. The backend processing system 135 may includes other modules or components for further offline/backend processing of an object instance, regardless of whether the object instance is identified as anomalous.

The above modules 410-440 need not be discrete modules. The configuration shown in FIG. 4 is meant only by way of example and not limitation; other configurations are within the scope of the present invention.

Figure 5:
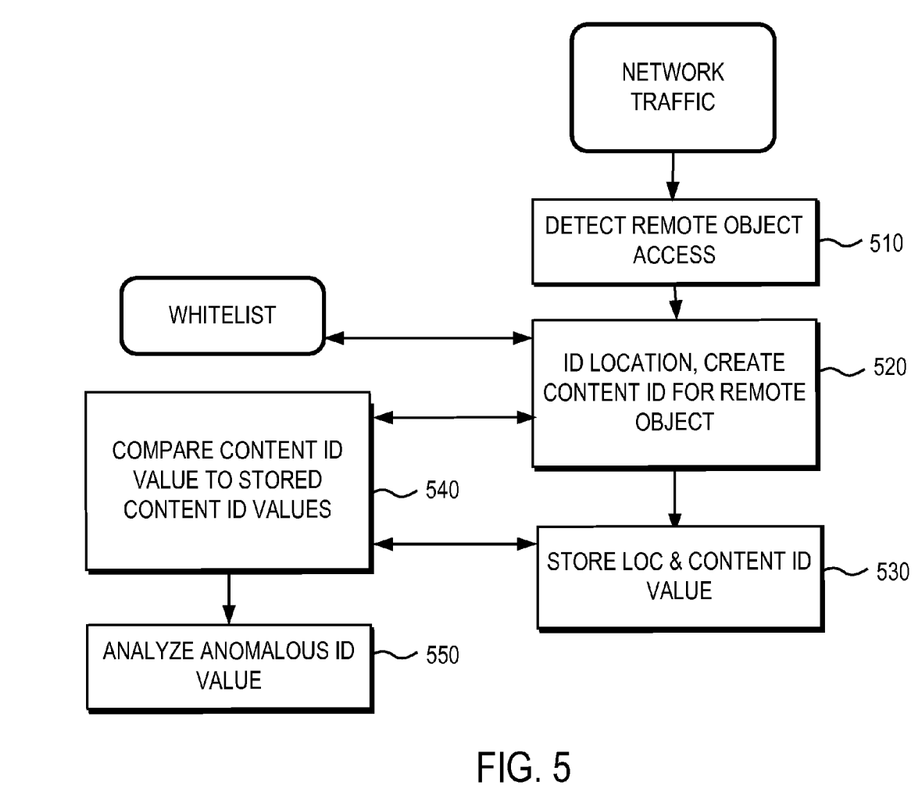
FIG. 5 is a flowchart illustrating method of identifying potentially malicious remote objects according to one embodiment.

FIG. 5 is a flowchart illustrating steps performed by a object analysis system 130 according to one embodiment. Other embodiments perform the illustrated steps in different orders, and/or perform different or additional steps. Moreover, some or all of the steps can be performed by modules other than those referenced.

A remote object access module 110 initially monitors network traffic until retrieval of an instance of a remote object 120 is detected 510 by the remote object access module 110. Detected 510 object instances are passed by the remote object access module 110 to an identification module 310 of an object analysis system 130.

Next the identification module 310 identifies a location for the object instance and creates 520 a content identification value for the instance content, such as a hash. Additional information may be extracted by the identification module 310 from the object instance, e.g., location from which it was downloaded (website and/or geographic location of website server), and date/time of retrieval.

The identification module 310 then passes the content identification value to the cached storage 320, or master storage 430, for storage 530 along with the object instance and addition information about the object instance. A value comparison module 330 then compares 540 the content identification value created 520 to stored content identification values for the same object and/or content from the same website as stored in the cached storage 320. The remote object instance also may be checked against a whitelist of known safe remote objects or locations, e.g., before the comparison is made.

If the object does not match, or is anomalous with respect to the stored content identification values, it is passed to the object characterization module 340 for further analysis 550. The further analysis may include labeling the object instance suspicious, using stored content identification value statistics for previous instances of the object, labeling as potentially malicious, and/or backend processing. Some of the further analysis may be performed by a backend processing system.

Because the actual traffic received by the client is monitored, the system allows for detection of instances of malicious objects sent to clients that might otherwise go undetected, e.g., by web crawlers receiving alternative instances from a malicious site while they are attempting to detect malicious remote objects via crawling.

The description in the specification is included to illustrate the operation of certain embodiments, is not all inclusive, and is not meant to limit the scope of the invention. The scope of the invention is to be limited only by the following claims. In particular, many additional features and variations will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The invention claimed is:

1. A computer-implemented method of cooperative identification of potentially malicious remote objects, comprising:
   in response to detection of client device access to an instance of a remote object:
      identifying a location associated with the instance of the remote object;
      creating a unique content identification value for content associated with the instance of the remote object;
      identifying content identification values associated with previous object instances of the remote object associated with the location;
      comparing the created unique content identification value for the instance of the remote object to the identified content identification values to determine whether the created content identification value for the instance of the remote object does not match at least one of the identified content identification values associated with the previous object instances of the remote object;
      in response to determining that the created unique content identification value for the instance of the remote object does not match at least one of the identified content identification values associated with the previous object instances of the remote object, analyzing the identified content identification values seeking to identify a legitimate reason why the created unique content identification value does not match at least one of the identified content identification values associated with the previous object instances of the remote object, the legitimate reason indicating that the instance of the remote object is not malicious due to the location returning unique content to each of a plurality of different geographical regions; and
      in response to identifying no legitimate reason why the created unique identification value does not match at least one of the identified content identification values associated with the previous object instance of the remote object, labeling the instance of the remote object as potentially malicious.

2. The method of claim 1, wherein analyzing the identified content identification values comprises analyzing timestamps for the identified content identification values and the created unique content identification value to identify whether the created unique content identification value was created after a date in which a content update was performed.

3. The method of claim 1, wherein the created unique content identification value and the identified content identification values comprise hash values.

4. The method of claim 1, wherein the remote object comprises data providing downloadable content.

5. The method of claim 4, wherein the remote object comprises one or more of: a web page, a downloadable file, a script written in an interpreted language, an executable program, an image, music, or multimedia content.

6. The method of claim 1, further comprising:
   transmitting an indication that the instance of the remote object is potentially malicious to other client devices attempting to access the instance of the remote object.

7. The method of claim 1, wherein the legitimate reason is further selected from a group consisting of: the location returns unique content to each user and the location has performed a content update.

8. The method of claim 1, wherein analyzing the identified content identification values comprises:
   identifying geographical locations of clients corresponding to the content identification values associated with the previous object instances of the remote object;
   comparing the geographical locations of the clients to determine geographical trends indicative that the location returns unique content to geographical regions associated with the geographical locations of the clients.

9. A non-transitory computer-readable storage medium having computer program instructions embodied therein for cooperative identification of potentially malicious remote objects, the instructions when executed performs steps comprising:
   detecting client device access to an instance of a remote object;
   identifying a location associated with the instance of the remote object;
   creating a unique content identification value for content associated with the instance of the remote object;
   identifying content identification values associated with previous object instances of the remote object associated with the location;
   comparing the created unique content identification value for the instance of the remote object to the identified content identification values to determine whether the created content identification value for the instance of the remote object does not match at least one of the identified content identification values associated with the previous object instances of the remote object;
   in response to determining that the created unique content identification value for the instance of the remote object does not match at least one of the identified content identification values associated with the previous object instances of the remote object, analyzing the identified content identification values seeking to identify a legitimate reason why the created unique content identification value does not match at least one of the identified content identification values associated with the previous object instances of the remote object, the legitimate reason indicating that the instance of the remote object is not malicious due to the location returning unique content to each of a plurality of different geographical regions; and
   in response to identifying no legitimate reason why the created unique identification value does not match at least one of the identified content identification values associated with the previous object instance of the remote object, labeling the instance of the remote object as potentially malicious.

10. The computer-readable storage medium of claim 9, wherein analyzing the identified content identification values comprises analyzing timestamps for the identified content identification values and the created unique content identification value to identify whether the created unique content identification value was created after a date in which a content update was performed.

11. The computer-readable storage medium of claim 9, wherein the created unique content identification value and the identified content identification values comprise hash values.

12. The non-transitory computer-readable storage medium of claim 9, wherein the legitimate reason is further selected from a group consisting of: the location returns unique content to each user and the location has performed a content update.

13. The non-transitory computer-readable storage medium of claim 9, wherein the remote object comprises data providing downloadable content.

14. The non-transitory computer-readable storage medium of claim 13, wherein the remote object comprises one or more of: a web page, a downloadable file, a script written in an interpreted language, an executable program, an image, music, or multimedia content.

15. The non-transitory computer-readable storage medium of claim 13, wherein the objection characterization module is further for:
   transmitting an indication that the instance of the remote object is potentially malicious to other client devices attempting to access the instance of the remote object.

16. The non-transitory computer-readable storage medium of claim 9, wherein analyzing the identified content identification values comprises:
   identifying geographical locations of clients corresponding to the content identification values associated with the previous object instances of the remote object;
   comparing the geographical locations of the clients to determine geographical trends indicative that the location returns unique content to geographical regions associated with the geographical locations of the clients.

17. A computer system configured for cooperative identification of potentially malicious remote objects, the system comprising:
   a computer processor;
   a computer-readable storage medium storing executable code, the code when executed by the computer processor perform steps comprising:
      identifying a location associated with an instance of a remote object;
      creating a unique content identification value for content associated with the instance of the remote object;
      identifying content identification values associated with previous object instances of the remote object associated with the location;
      comparing the created unique content identification value for the instance of the remote object to the identified content identification values to determine whether the created content identification value for the instance of the remote object does not match at least one of the identified content identification values associated with the previous object instances of the remote object;
      in response to determining that the created unique content identification value for the instance of the remote object does not match at least one of the identified content identification values associated with the previous object instances of the remote object, analyzing the identified content identification values seeking to identify a legitimate reason why the created unique content identification value does not match at least one of the identified content identification values associated with the previous object instances of the remote object, the legitimate reason indicating that the instance of the remote object is not malicious due to the location returning unique content to each of a plurality of different geographical regions; and
      in response to identifying no legitimate reason why the created unique identification value does not match at least one of the identified content identification values associated with the previous object instance of the remote object, labeling the instance of the remote object as potentially malicious.

18. The computer system of claim 17, wherein analyzing the identified content identification values comprises analyzing timestamps for the identified content identification values and the created unique content identification value to identify whether the created unique content identification value was created after a date in which a content update was performed.

19. The computer system of claim 17, wherein the created unique content identification value and the identified content identification values comprise hash values.

20. The computer system of claim 17, wherein analyzing the identified content identification values comprises:
   identifying geographical locations of clients corresponding to the content identification values associated with the previous object instances of the remote object;
   comparing the geographical locations of the clients to determine geographical trends indicative that the location returns unique content to geographical regions associated with the geographical locations of the clients.

* * * * *